April 3, 1956 E. WOODBURY 2,740,685

MAGNETICALLY STABILIZED SCANNING STYLUS

Filed May 25, 1953

INVENTOR.

E. Woodbury 2,740,685

MAGNETICALLY STABILIZED SCANNING STYLUS

Eugene Woodbury, Altadena, Calif., assignor to Bendix Aviation Corporation, North Hollywood, Calif., a corporation of Delaware Application May 25, 1953, Serial No. 357,324

1 Claim. (Cl. 346—74)

This invention relates to scanning recorders such as are used in depth recording and the like, and is particularly applicable, although not limited to, recorders of the type disclosed in U. S. Patent 2,593,068, issued April 15, 1952, and U. S. Patent No. 2,614,903, issued October 21, 1952.

Both patents disclose scanning recorders employing an elongated resilient stylus extending from a rotating drum with guide means for deflecting the free end of the stylus into a linear scanning path extending across a record sheet once during each revolution of the drum. Because of the change in direction of the stylus end as it enters the linear scanning path it has a tendency to bounce, which tendency increases with speed and limits the speed at which such recorders can be operated.

An object of the invention is to increase the speed at which scanning recorders of the type referred to can be operated.

Another object is to reduce bouncing of a scanning stylus away from the record sheet at high speed.

Another object is to generally stabilize the movement of a scanning stylus through its scanning path.

Other more specific objects and features of the invention will appear from the description to follow.

Briefly stated, the invention resides in utilizing magnetic attraction between a resilient stylus and a deflecting or guide member (which deflects the stylus end into a desired scanning path) to oppose tendencies of the stylus to bounce away from the guide member or from the record sheet.

A full understanding of the invention can be had from the following detailed description with reference to the drawings, in which.

Figure 1:
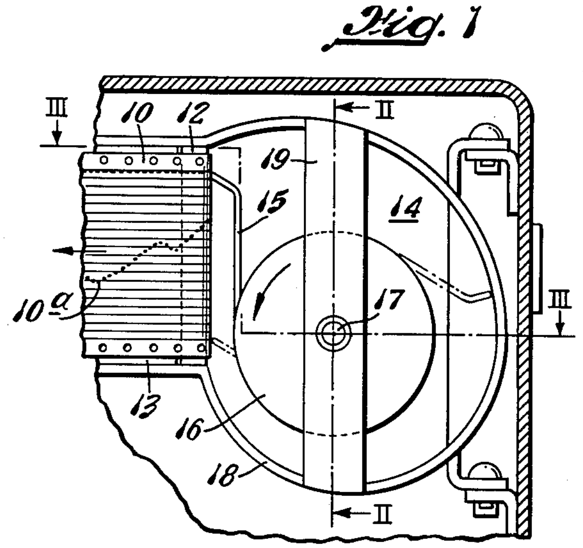
Fig. 1 is a front elevation of a recorder stylus mechanism in accordance with the invention.
Figure 2:
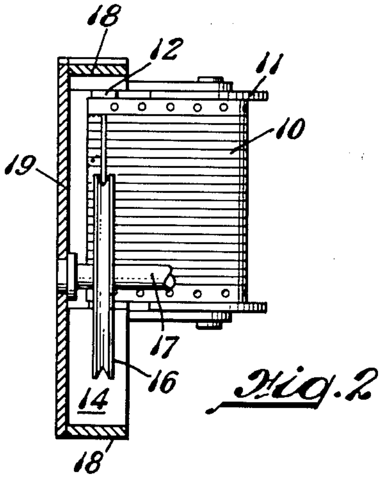
Fig. 2 is a vertical section taken in the plane II—II of Fig. 1.

Referring to Figs. 1 and 2 there is shown a paper record sheet 10 in the form of a long strip that extends from a spool 11 and is supported in a record path by a backing member 12 and a plate 13. During operation, the record sheet 10 is slowly drawn through the record path and has a record line 10*a* produced thereon by a scanning mechanism 14. This scanning mechanism comprises an elongated resilient stylus 15 anchored at one end to a stylus-moving means consisting of a drum 16 on a constantly rotating shaft 17. Fig. 1 shows the stylus 15 with its free end positioned near the upper edge of the record sheet 10, and it will be noted that the drum

16 is so spaced from the backing member 12 that the main portion of the stylus 15 extends substantially parallel to the member 12 and tangent to the drum 16. As the drum 16 rotates in counterclockwise direction, the stylus 15 is moved downwardly across the record sheet 10 at substantially uniform speed because the stylus winds onto the drum 16 during this portion of the cycle. When the stylus 15 has reached the bottom of the record sheet 10, as indicated by the dotted line showing in Fig. 1, the normally straight portion of the stylus is substantially completely bent around the drum 16. To guide the stylus during its bending or wrapping movement about the drum the latter may have a V-shaped groove 16*a* in its periphery as shown in Fig. 3.

When unrestrained by the backing member 12 the stylus 15 returns to extended relation with respect to the drum 16 ready for a new movement across the record sheet 10. To control the unwinding of the stylus from the drum, a guide 18 may be provided which extends from the lower edge of the record sheet 10 in approximately a spiral path about the axis of the shaft 17 to the upper edge of the record sheet 10. This restricts the stylus 15 to gradual movement outwardly from the drum, from the time it leaves the bottom of the record sheet until it returns to the top thereof. However, the guide 18 is not essential and may be sometimes dispensed with. The guide 18 may be connected at its opposite ends to the backing member 12 and be extended beyond the latter to constitute a portion of the framework for other parts of the instrument. A vertical frame member 19 is shown connected at its ends to the guide member 18 and constituting a support for a bearing structure at one end of the shaft 17. The other end of the shaft 16 may be supported by a driving motor which is not shown.

The record line 10*a* is formed by applying an electrical impulse to the stylus 15 at a time in its cycle determined by the information to be recorded. The record sheet 10 may be a special paper that is discolored in response to an electrical discharge therethrough. The means for applying the electrical impulse to the stylus 15 and the particular construction of the record sheet 10 constitute no part of the present invention and are therefore not described in detail. These features are more fully described in the prior patents previously referred to.

Figure 3:
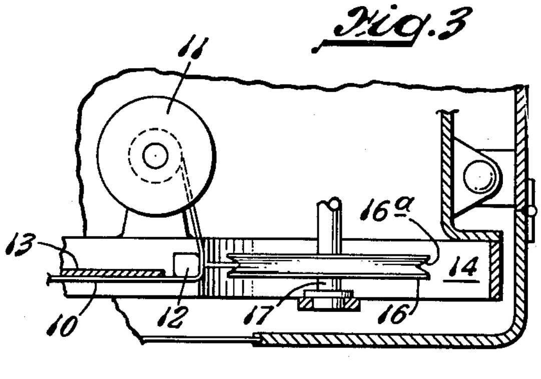
Fig. 3 is a horizontal section taken in the plane III—III of Fig. 1.
Figure 4:
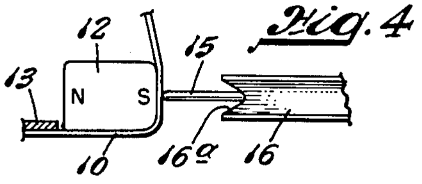
Fig. 4 is a portion of Fig. 3 drawn to a larger scale.

The present invention, as illustrated in Figs. 1, 2, and 3, consists in employing, as the backing member 12, a permanent magnet and employing a stylus 15 of ferro-magnetic material such as steel. In Figs. 1, 3 and 4, the backing member 12 is transversely magnetized so that its entire face juxtaposed to the scanning path described by the free end of the stylus 15 in its movement across the record sheet is magnetized to equal extent and exerts an attraction on the stylus 15 which holds it against the paper and strongly resists any tendency of the stylus to bounce during its traverse of the paper. This tendency of the stylus to bounce increases with the speed of rotation of the stylus carrier 16 and definitely limits the speed at which this type of recorder can be operated. It has been found that by providing the magnetic attraction between the backing member 12 and the stylus, the speed of operation can be greatly increased before objectionable bouncing or erratic operation of the stylus results.

Although it presently appears desirable to use a transversely magnetized backing member 12 as shown in Fig. 4, it is not essential that the member be magnetized in this fashion. The greatest tendency of the stylus to bounce occurs at the time it first begins its traverse through its scanning path because it is at this time that the motion of the stylus end is suddenly changed from a substantially circular movement into a linear movement. It is therefore much more important to have a strong magnetic attraction holding the stylus against the paper during the initial portion of its movement through he scanning path than thereafter. Hence a longitudinally magnetized backing bar may be employed with satisfactory results.

Figure 5:
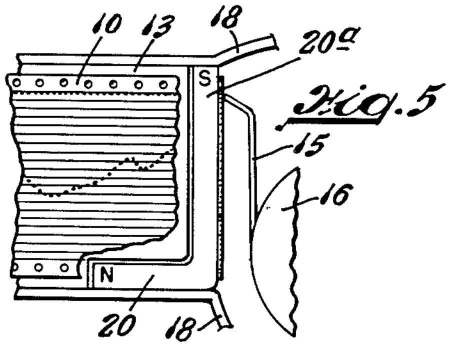
Figs. 5 and 6 are elevational views similar to a portion of Fig. 1 but showing alternative constructions.

Referring to Fig. 5, there is shown an L-shaped longitudinally magnetized bar 20, one leg 20*a* of which is juxtaposed to the stylus path throughout its length and functions the same as the backing bar 12. With this arrangement, the upper end of the backing bar is relatively strongly magnetized, but the magnetization diminishes downwardly so that it is relatively low at the lower end of the stylus path where there is less tendency for the stylus to bounce.

Figure 6:
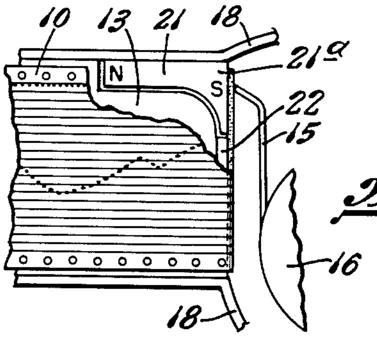

In Fig. 6 another alternative arrangement is shown in which a longitudinally magnetized bar magnet 21 is positioned horizontally with one of its end faces juxtaposed to the stylus path and constituting a portion of the backing member. Thus the end face 21*a* of the magnet 21 constitutes the upper portion of the backing member, and a non-magnetic member 22 extending downwardly from the magnet 21 forms the rest of the backing member. This construction provides a strong magnetic attraction for the stylus in the upper end of the scanning path and no magnetic attraction at all in the lower portion.

Figure 7:
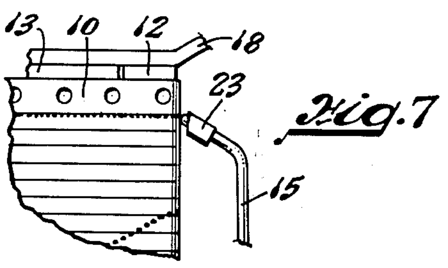
Fig. 7 is a detail elevation view of a smaller portion of Figs. 1, 5, and 6 showing an alternative stylus structure that can be employed.

It may sometimes be desirable to provide a separate body of ferro-magnetic material on the stylus to increase the magnetic attraction exerted thereon by the backing magnet. To this end a collar of ferro-magnetic material 23 may be secured to the stylus 15 closely adjacent its free end, as shown in Fig. 7. With this construction the stylus 15 may be of non-magnetic material.

It will be noted that the backing member 12 performs two functions, one of which is to support the record sheet in the record path and the other of which is to deflect the stylus 15 into its scanning path as it traverses the record.

Although for the purpose of explaining the invention, a particular embodiment thereof has been shown and described, obvious modifications will occur to a person skilled in the art, and I do not desire to be limited to the exact details shown and described.

I claim:

A recorder comprising: means for supporting and moving a record sheet through a record path past a scanning path extending transversely across said record path on the front side thereof; a scanning mechanism including a stylus carrier and an elongated resilient stylus attached to said carrier and having a free scanning end extending from said carrier; means rotatably supporting and rotating said carrier about a fixed axis; said stylus, when unrestrained, extending from said carrier in a direction having a radial component away from said axis and decribing a circular path intersecting said stylus path; and means for bending said stylus to deflect said free scanning end thereof into said scanning path for movement therethrough during a portion of each revolution of said stylus carrier; said stylus comprising a ferromagnetic body; and said means for bending said stylus comprising an elongated magnet longitudinally magnetized and having one longitudinal section extending parallel to said scanning path on the opposite side of said record path from said stylus with a magnetic pole adjacent the approach end of the scanning path and an intermediate portion of lesser magnetic attractive force at the other end of said scanning path, whereby the magnetic attraction between the stylus-bending member and the stylus is greater at the approach end of the scanning path than where the stylus leaves the scanning path.

References Cited in the file of this patent

UNITED STATES PATENTS

| | | |
|---|---|---|
| 2,591,138 | Cooley | Apr. 1, 1952 |
| 2,593,068 | Stamper | Apr. 15, 1952 |
| 2,643,174 | Cooley | June 23, 1953 |